US012650636B2

(12) United States Patent
Grottesi

(10) Patent No.: US 12,650,636 B2
(45) Date of Patent: Jun. 9, 2026

(54) STEERING WITH SHIFTING SYSTEM FOR A CAMERA DOLLY PARTICULARLY FOR FILM SHOOTING

(71) Applicant: Armando Grottesi, Zagarolo (IT)

(72) Inventor: Armando Grottesi, Zagarolo (IT)

(*) Notice: Subject to any disclaimer, the term of this patent is extended or adjusted under 35 U.S.C. 154(b) by 280 days.

(21) Appl. No.: 18/470,047

(22) Filed: Sep. 19, 2023

(65) Prior Publication Data

US 2024/0094609 A1     Mar. 21, 2024

(30) Foreign Application Priority Data

Sep. 19, 2022     (IT) ......................... 102022000019173

(51) Int. Cl.
*G03B 17/56*          (2021.01)
*F16M 11/42*          (2006.01)

(52) U.S. Cl.
CPC ........... *G03B 17/561* (2013.01); *F16M 11/42* (2013.01)

(58) Field of Classification Search
CPC ....... G03B 17/561; F16M 11/42; B62B 3/001
USPC ...................................................... 280/47.11
See application file for complete search history.

(56) References Cited

U.S. PATENT DOCUMENTS

| | | | |
|---|---|---|---|
| 2,834,605 A | 5/1958 | Mccollough | |
| 2,915,319 A | 12/1959 | Kumler et al. | |
| 3,337,231 A | * 8/1967 | Drake ...................... | B62D 7/02 |
| | | | 180/409 |
| 4,950,126 A | * 8/1990 | Fabiano ................ | B66F 11/048 |
| | | | 280/47.11 |

| | | | |
|---|---|---|---|
| 5,176,401 A | * 1/1993 | Chapman ............... | F16M 11/42 |
| | | | 280/47.11 |
| 6,109,626 A | 8/2000 | Chapman | |
| 6,135,465 A | 10/2000 | Chapman | |
| 6,401,559 B1 | 6/2002 | Grottesi | |
| 6,520,642 B1 | 2/2003 | Chapman | |

(Continued)

FOREIGN PATENT DOCUMENTS

DE      10 2008 047 898 A1     3/2010

OTHER PUBLICATIONS

International Search Report issued Jun. 19, 2023 in 102022000019173 filed on Sep. 19, 2022, 3 pages (with Translation of Category of Cited Documents).

(Continued)

*Primary Examiner* — Hau V Phan
(74) *Attorney, Agent, or Firm* — Oblon, McClelland, Maier & Neustadt, L.L.P.

(57) ABSTRACT

A steering with shifting system for a camera dolly, including a steering column that can be connected to steering wheels of a camera dolly by first motion transmission, the steering column being configured to rotate around its central axis in a plurality of positions from a central position to rotate the steering wheels by the first motion transmission; a handlebar integrally connected to the steering column and configured to be moved to rotate the steering column in a respective position of the plurality of positions; a support body configured to contain the first motion transmission, the support body including a bell-shaped sleeve coaxial to the steering column, the steering column being at least partly inserted in the bell-shaped sleeve and pivotable with respect to the bell-shaped sleeve; and a central position indication element configured to engage when the steering column is in the central position.

10 Claims, 2 Drawing Sheets

(56) References Cited

U.S. PATENT DOCUMENTS

| | | | |
|---|---|---|---|
| 8,282,213 B2 * | 10/2012 | Chapman | B66F 11/048 |
| | | | 280/47.11 |
| 8,727,318 B2 | 5/2014 | Chapman | |
| 8,939,454 B2 * | 1/2015 | Stillinger | B62K 21/00 |
| | | | 280/271 |
| 9,050,985 B1 * | 6/2015 | Chapman | B62B 3/001 |
| 9,211,895 B2 * | 12/2015 | Chapman | B62B 3/001 |
| 2011/0278426 A1 * | 11/2011 | Duffy | B62D 1/195 |
| | | | 248/674 |
| 2014/0021422 A1 | 1/2014 | Chapman | |
| 2015/0175181 A1 | 6/2015 | Chapman | |

OTHER PUBLICATIONS

United Kingdom Search Report issued Feb. 13, 2024 in United Kingdom Application GB2313984.3, 1 page.

* cited by examiner

STEERING WITH SHIFTING SYSTEM FOR A CAMERA DOLLY PARTICULARLY FOR FILM SHOOTING

CROSS REFERENCE TO RELATED APPLICATIONS

This application is based on and claims the benefits of priority to Italian Patent Application No. 102022000019173, filed on Sep. 19, 2022, the entire contents of which are incorporated herein by reference.

BACKGROUND

The present invention refers to a steering with shifting system for a camera dolly, particularly for film shooting.

The present invention is usefully employed in the field of cinematography.

Nowadays, using the camera dollies for making video shooting for example of a film is known in the field of cinematography.

As known, a camera dolly is a carriage used for moving a camera mounted thereon, such as to allow the quick displacement thereof in any direction depending on the framing requirements.

For this purpose, the camera dollies are configured to accommodate thereon an operator commissioned to carry out the technical activities of video shooting by the camera and simultaneously to direct the camera dolly by a dedicated handlebar and to select the modes for moving the camera dolly. Instead, the physical displacement of the camera dolly is usually carried out by a second operator on the ground, namely not on board the camera dolly, commissioned to push the camera dolly.

BRIEF DESCRIPTION

The selection of the moving modes occurs by dedicated controls on the handlebar, generally rotating one knob of the other knob of the handlebar in predefined specific positions. Therefore, the knobs allow to pass from a moving mode to the other, while the handlebar allows to move the wheels according to the predetermined movements characterizing the selected mode.

In order to move the camera dolly in multiple possible travel directions, the camera dollies are generally provided with at least four steering wheels capable of rotating in a plane parallel to the bearing surface of the camera dolly itself.

In particular, based on the configuration of such steering wheels, the moving of the camera dolly can occur in three different modes in which the wheels can move according to three different predetermined movements. In all the three modes, when the handlebar is kept straight the camera dolly advances with a translating movement.

According to a first mode, referred to as conventional, the rear or front wheels are locked in rotation, while the others can rotate/steer by 360°. In this two steering wheel mode, if the handlebar is rotated the camera dolly is capable of turning, describing a circumference arc.

According to a second mode, referred to as round, the front wheels and the rear wheels rotate by the same angle, but in directions opposite to each other when the handlebar is rotated. In this four steering wheel mode, the camera dolly is capable of rotating around its geometrical centre. Therefore, the round mode allows the camera dolly to rotate in a very narrow space.

According to a third mode, referred to as crab, the front wheels and the rear wheels rotate by the same angle and in the same direction when the handlebar is rotated. In this four steering wheel mode, the camera dolly is capable of moving by making translating movements. Such mode is usually the most used, as it allows a greater moving versatility than the other two.

In the known camera dollies, the handlebar is connected to a steering column, connected in turn by motion transmission means to the wheels of the camera dolly.

In order to pass from a moving mode to the other, the steering column have to be necessarily returned, by the movement of the handlebar, in the central position. Such position is a position in which both the rear wheels and the front wheels are not rotated, namely in which the wheels are parallel to each other and the front wheels are aligned to the rear wheels.

However, knowing when such position is exactly reached is not easy for the operator commissioned to carry out the technical activities of video shooting, since there are no references univocally indicating it. Accordingly, the operator does not know when he/she is in the condition to change moving mode and thus researches the central position with a degree of uncertainty. The lack of an accurate reference often results in problems regarding the requirements of video shooting as it lengthens the time required to pass from a mode to the other.

An object of the present invention is to overcome the above-mentioned drawbacks and in particular that of ideating a steering with shifting system for a camera dolly, particularly for film shooting, which allows to indicate for certain when the steering column is in the central position.

These and other objects according to the present invention are achieved by making a steering with shifting system for a camera dolly, particularly for film shooting, as set forth in claim 1.

Further features of the steering with shifting system are object of the dependent claims.

BRIEF DESCRIPTION OF DRAWINGS

The features and advantages of a steering with shifting system for a camera dolly, particularly for film shooting, according to the present invention will be more apparent from the following exemplary and non-limiting description, referred to the attached schematic drawings in which.

DETAILED DESCRIPTION

Figure 1:
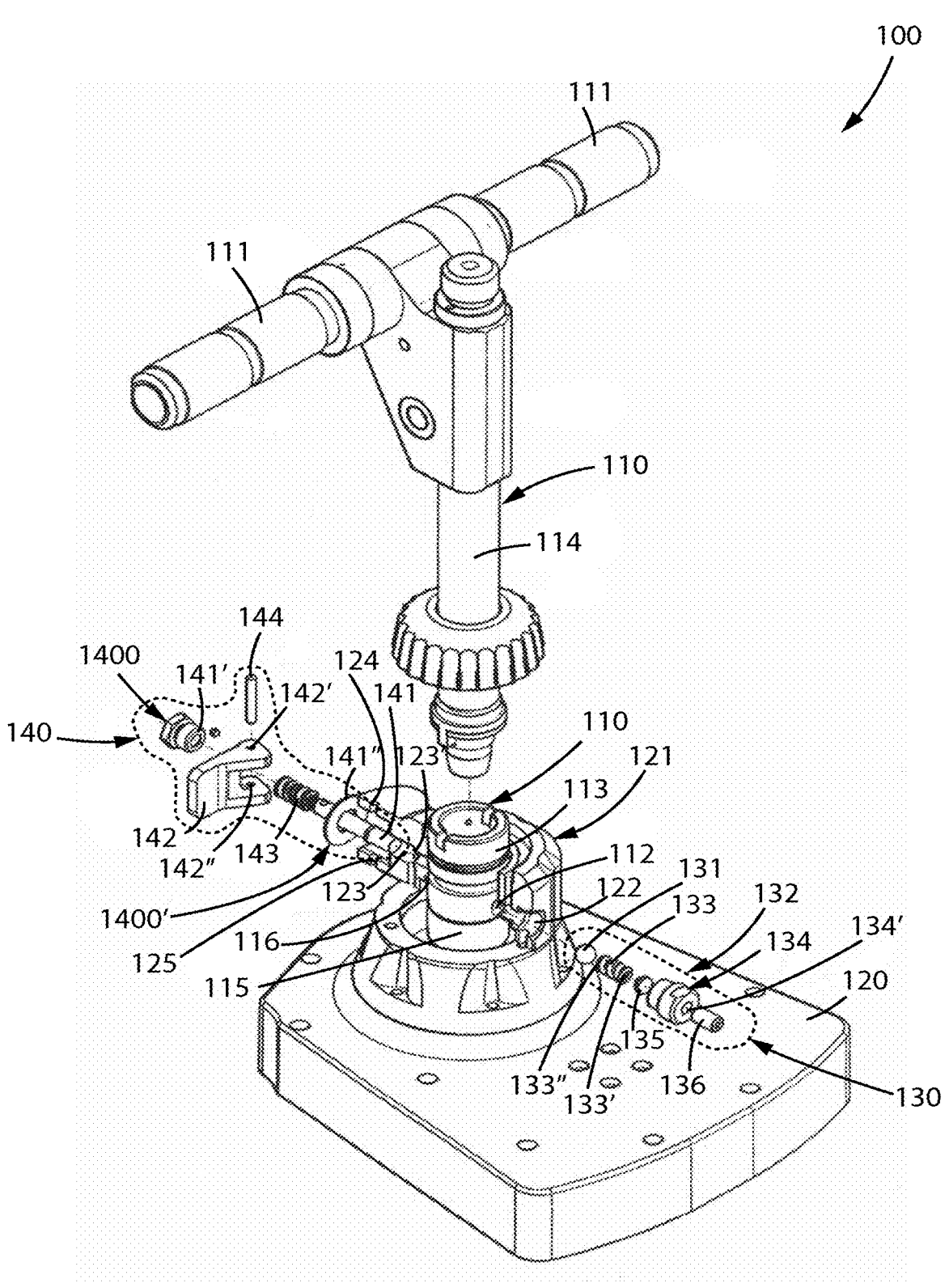
FIG. 1 is an exploded perspective view of a steering with shifting system according to the present invention.

With reference to the figure, a steering with shifting system for a camera dolly, particularly for film shooting, overall indicated by 100, is shown.

The camera dolly is provided with steering wheels configured to move the camera dolly depending on the framing requirements.

The steering with shifting system 100 comprises a steering column 110 that can be connected to the steering wheels of the camera dolly by first motion transmission means.

The steering column 110 is configured to rotate around its central axis in a plurality of positions from a central position to rotate the steering wheels by the first motion transmission means.

Central position means the position in which all the four steering wheels of the camera dolly are not rotated and have the rotation axes parallel to each other.

Plurality of positions means any position, different from the central position, assumed by the steering column 110 after a rotation around its central axis.

The first motion transmission means, as will be better explained below, allow the steering wheels of the camera dolly to rotate after a rotation of the steering column 110.

Furthermore, the steering with shifting system 100 comprises a handlebar 111 integrally connected to the steering column 110 and configured to be moved to rotate the steering column 110 in a respective position of the plurality of positions.

Therefore, the handlebar 111 allows to rotate the steering column 110 and the rotation of the steering column 110 is transferred to the steering wheels of the camera dolly by the first motion transmission means.

Furthermore, the steering with shifting system 100 comprises a support body 120 configured to contain the first motion transmission means. Such support body 120 comprises a bell-shaped sleeve 121 coaxial to the steering column 110. The steering column 110, furthermore, is at least partly inserted in the bell-shaped sleeve 121 and is pivotable with respect to it.

In more detail, the bell-shaped sleeve 121 is a hollow body protruding from a surface of the support body 120; the steering column 110, which can rotate with respect to the bell-shaped sleeve 121, which remains stationary, is housed inside the cavity of the bell-shaped sleeve 121.

The steering with shifting system 100 is characterized by comprising a central position indication element 130 configured to engage when the steering column 110 is in the central position.

In more detail, the bell-shaped sleeve 121 comprises a first through hole 122 in which the central position indication element 130 is at least partly inserted. The steering column 110, instead, has a first recess 112 configured to be aligned to the first through hole 122 when the steering column 110 is in the central position. Therefore, the central position indication element 130 is configured to enter at least partly in the first recess 112 when the steering column 110 is in the central position. In this way, the central position indication element 130 is capable of accurately indicating when the steering column 110 is in the central position.

Indeed, as will be better explained below, the central position indication element 130 engages only when the first recess 112 is aligned to the first through hole 122.

When the steering column 110 rotates from the central position in a different position, the central position indication element 130 comes out from the first recess 112, as will be better described below.

Preferably, the central position indication element 130 comprises an abutment body 131 in contact with the side wall 115 of the steering column 110.

Such abutment body 131, as will be better explained below, is configured to enter at least partly in the first recess 112 when the steering column 110 is in the central position.

The abutment body 131 is for example a ball and accordingly, the first recess 112 is shaped to accommodate a ball-shaped cap of such ball.

Furthermore, the central position indication element 130 comprises fastening means 132 fixed to the bell-shaped sleeve 121.

Furthermore, the central position indication element 130 comprises a first elastic element 133 interposed between the abutment body 131 and the fastening means 132. The first elastic element 133 is configured to maintain the abutment body 131 pushing on the side wall 115. The first elastic element 133 is for example a spring.

The end of the fastening means 132 facing the outside of the first through hole 122 is locked with respect to the bell-shaped sleeve 121 and thus the fastening means 132 fix the abutment body 131 and the first elastic element 133 to the bell-shaped sleeve 121.

In more detail, the first elastic element 133 has a first end 133' fixed within the first through hole 122 by the fastening means 132, and a second end 133" opposite to the first end 133" facing the abutment body 131. When the steering column 110 is not in the central position, the first end 133" is in contact with the abutment body 131; furthermore, the first elastic element 133 is compressed inside the first through hole 122 between the abutment body 131 and the fastening means 132, and accordingly exerts an elastic force on the abutment body 131. Therefore, as long as the first recess 112 is not aligned to the first through hole 122, the abutment body 131 does not have a free space in front of it, and the elastic force of the first elastic element 133 keeps pushing the abutment body 131 on the side wall 115.

Furthermore, the abutment body 131 is kept pushing on the side wall 115 even when the steering column 110 rotates, until the first recess 112 and the second through hole 122 continue not to be aligned.

When the first recess 112 is aligned to the first through hole 122, and thus when the steering column 110 is in the central position, the abutment body 131 has a free space in front of it, represented by the first recess 112; in this way, the first elastic element 133 can extend under the effect of the elastic force. The elastic element 133 by the second end 133" pushes the abutment body 131 towards the first recess 112 and the abutment body 131 enters at least partly inside the first recess 112.

When the abutment body 131 is pushed by the first elastic element 133 inside the first recess 112, the operator holding the handlebar 111 by hand perceives the engagement through the handlebar 111. In this way, the operator is capable of exactly knowing which is the steering moment, i.e., when the steering column 110 reaches the central position, such as to later select the mode for moving the camera dolly between conventional, round or crab.

After the central position indication element 130 engaged and thus after the abutment body 131 entered in the first recess 112 pushed by the first elastic element 133, until the steering column 110 remains in the central position, i.e., until the first recess 112 and the second through hole 122 are aligned, the first elastic element 133 is extended and does not keep pushing the abutment body 131 on the first recess 112.

At this point, when the steering column 110 rotates from the central position in a respective position of the plurality of positions, the abutment body 131 comes out from the first recess 112.

Preferably, the first recess 112 has a curved surface shape such that when the abutment body 131 is inserted therein and the steering column 110 rotates toward a position of the plurality of positions, upon progressive misalignment of the first recess 112 from the first through hole 122, the abutment body 131 is pushed again inside the first through hole 122 by a contour wall of such first through hole 122, compressing the first elastic element 133 again. Thereby, when the first recess 112 is completely misaligned to the first through hole 122, the abutment body 131 is again completely withdrawn from the first recess 112 and inserted completely within the first through hole 122, and again is further kept pushing on the side wall 115 by the second end 133" of the first elastic element 133.

Preferably, the fastening means 132 comprise a pawl 134 having a through cavity 134'. Therefore, the pawl 134 is stationary with respect to the first through hole 122.

Still preferably, the fastening means 132 comprise a spring pusher 135 coupled to the first elastic element 133 and disposed at the through cavity 134'. In more detail, the spring pusher 135 is coupled to the first end 133' of the first elastic element 133. Finally, the fastening means 132 comprise a closing pin 136 housed in the through cavity 134' and connected to the spring pusher 135.

According to a preferred embodiment, the steering with shifting system 100 comprises a locking element 140 configured to lock the steering column 110 in the central position. Therefore, the locking element 140, is capable of preventing the relative rotation of the steering column 110 with respect to the bell-shaped sleeve 121, as will be better described below.

According to such embodiment, the steering column 110 comprises a second recess 116 and the bell-shaped sleeve 121 comprises a second through hole 123. The second recess 116 is configured to be aligned to the second through hole 123 when the steering column 110 is in the central position.

Preferably, when the steering column 110 is in the central position, the first recess 112, the first through hole 122, the second recess 116 and the second through hole 123 are aligned to each other.

Preferably, the locking element 140 comprises a pin 141 inserted in the second through hole 123 and configured to switch between a locking configuration wherein it is inserted at least partly in the second recess 116 and an unlocking configuration wherein it is withdrawn from the second recess 116.

When the pin 141 is inserted in the second recess 116, the steering column 110 is locked in rotation and thus is not free to rotate with respect to the bell-shaped sleeve 121, accordingly locking the rotation of the wheels, which remain parallel and aligned to each other. When the pin 141 is withdrawn from the second recess 116 and is inserted only in the second through hole 123, the steering column 110 is free to rotate with respect to the bell-shaped sleeve 121, accordingly rotating the wheels.

Preferably, the locking element 140 comprises a lever 142 configured to rotate to cooperate with the pin 141 in contrast with a second elastic element 143 such as to move in translation the pin 141 to switch the pin 141 from the unlocking configuration to the locking configuration or vice versa.

The second elastic element 143 is for example a spring.

The translation of the pin 141 occurs in a direction parallel to the central axis of the second through hole 123 and the second recess 116 such that the pin 141 can be inserted or withdrawn from such second recess 116.

As will be better explained below, the lever 142, when driven, for example manually by an operator, rotates pushing the pin 141 in the second recess 116; the insertion of the pin 141 in the second recess 116 occurs in contrast with the second elastic element 143, which thus is compressed upon switching the pin 141 from the unlocking configuration to the locking configuration. On the other hand, the withdrawal of the pin 141 from the second recess 116, and thus the switching of the pin 141 from the locking configuration to the unlocking configuration, occurs due to the extension of the second elastic element 143, allowed by the rotation of the lever 142.

Preferably, the pin 141 comprises a first larger diameter portion 1400 and a second larger diameter portion 1400' identifying a first abutment wall 141' and a second abutment wall 141", respectively.

In more detail, the first abutment wall 141' is the wall of the first larger diameter portion 1400 proximal to the bell-shaped sleeve 121, while the second abutment wall 141" is the wall of the second larger diameter portion 1400' distal with respect to the bell-shaped sleeve 121. In other words, the first abutment wall 141' faces the bell-shaped sleeve 121, while the second abutment wall 141" faces the lever 142.

Preferably, the pin 141 comprises a bushing defining the first abutment wall 141'.

Preferably, the pin 141 comprises a washer defining the second abutment wall 141".

Furthermore, the second elastic element 143 is in abutment with the first abutment wall 141' and with a counterboring wall 123' formed within the second through hole 123. In more detail, the counterboring wall 123' can be a wall protruding from the longitudinal developing surface of the second through hole 123, such as to narrow the section of the second through hole 123.

The lever 142 is pivotally coupled to the bell-shaped sleeve 121.

Furthermore, the lever 142 has a cam profile cooperating with the second abutment wall 141" to insert the pin 141 in the second recess 116 by switching the pin 141 from the unlocking configuration to the locking configuration. On the other hand, the second elastic element 143 is configured to push on the first abutment wall 141' to withdraw the pin 141 from the second recess 116 when the lever 142 is rotated by switching the pin 141 from the locking configuration to the unlocking configuration.

Furthermore, the second elastic element 143 is preloaded in compression.

When the pin 141 is in the unlocking configuration, the pin 141 is not inserted in the second recess 116 if the lever 142 is not rotated due to the preload of the second elastic element 143.

When the lever 142 rotates to switch the pin 141 from the unlocking position to the locking position, the cam profile exerts a load force on the second abutment wall 141". Therefore, the cam profile pushes on the second abutment wall 141" such that the pin 141 is inserted in the second recess 116. Meanwhile, the second elastic element 143, due to the translation of the pin 141 in the second through hole 123 and thus to the approach of the first abutment wall 141' to the counterboring wall 123', is more compressed than the preload compression. During such switching, the compressive force of the second elastic element 143 is equal and opposite to the load force. In this way, if the rotation of the lever 142 is interrupted when the pin 141 is not yet completely switched from the unlocking configuration to the locking configuration, the second elastic element 143 does not extend and does not push on the first abutment wall 141' to withdraw the pin 141 from the second recess 116.

Even when the pin 141 is in the locking configuration, the compressive force is equal and opposite to the load force. In this way, the pin 141 remains inserted in the second recess 116 if it is in the locking configuration and if the lever 142 is not rotated.

At this point, the lever 142 can be rotated to switch the pin 141 from the locking configuration to the unlocking configuration. In such case, the second elastic element 143 extends and pushes on the first abutment wall 141', moving the latter away from the counterboring wall 123'. In this way, the elastic return force of the second elastic element 143 causes the pin 141 to be withdrawn from the second recess 116. During such step, the load force exerted by the cam profile is always equal and opposite to the compressive force of the second elastic element 143, which is extending; in this way, in the case where the rotation of the lever 142 is interrupted, the second elastic element 143 does not further extend to withdraw the pin 141 from the second recess 116.

Preferably, the lever 142 is configured to make a 180° rotation to switch the pin 141 from the unlocking configuration to the locking configuration or vice versa.

Preferably, the bell-shaped sleeve 121 has two holes 124, 125 coaxial to each other. In such case, the lever 142 has two through slots 142', 142" coaxial to each other and placed at a respective hole 124, 125. Furthermore, the locking element 140 comprises a hinging pin 144 passing through the holes 124, 125 and the through slots 142', 142" connecting the lever 124 to the bell-shaped sleeve 121.

It should be noted that the steering column 110 preferably comprises a shaft 113 connected to the first motion transmission means and a rod 114 coupled to the handlebar 111. The shaft 113 and the rod 114 are integrally connected to each other, for example by a snap-fit or screw coupling.

Accordingly, the above-described first recess 112, side wall 115 and second recess 116 are to be intended with reference to the shaft 113 of the steering column 110.

Figure 2:
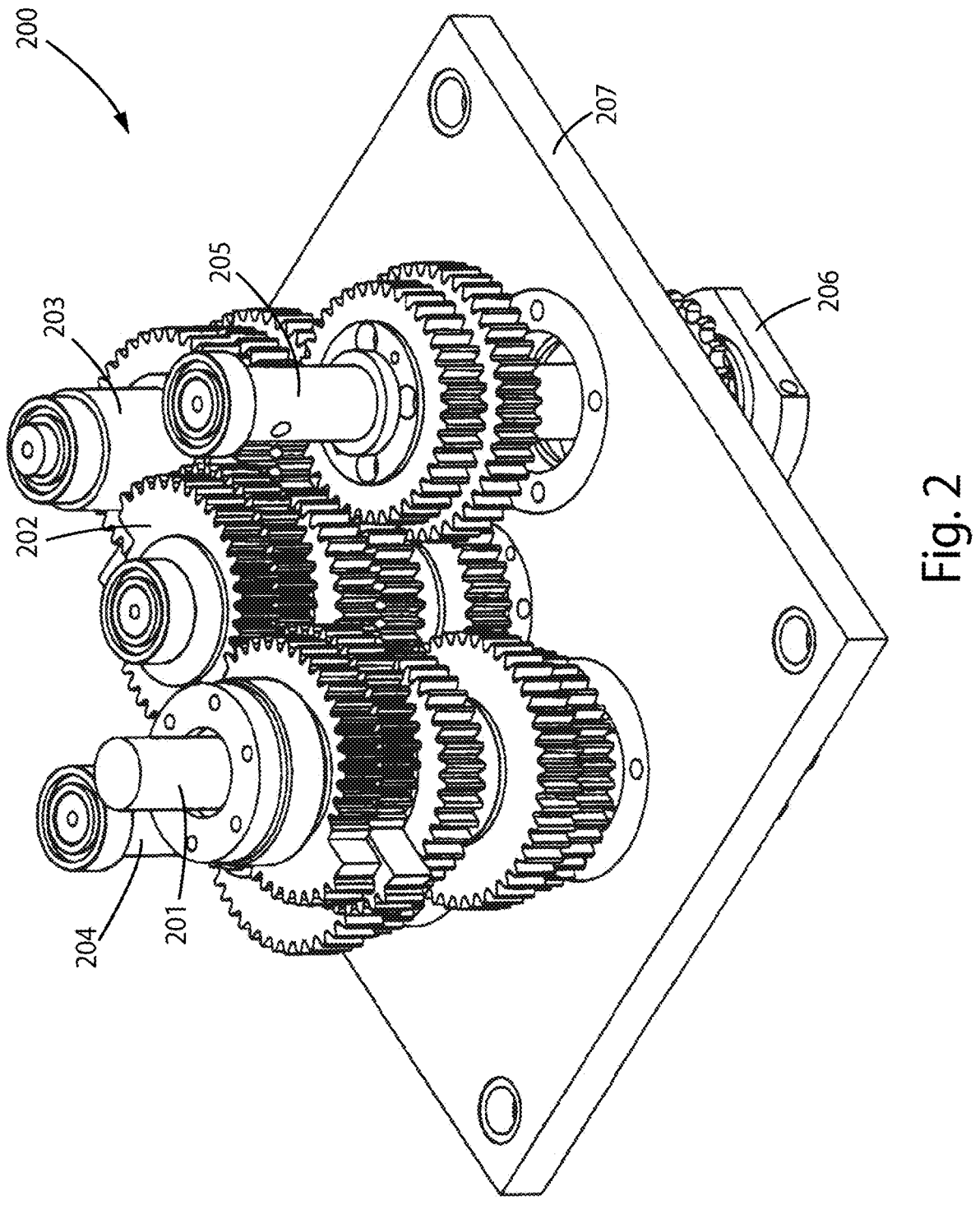
FIG. 2 is a perspective view of a differential that can be connected to the steering with shifting system of FIG. 1.

The present invention particularly applies to a camera dolly in which the first motion transmission means comprise a differential 200 as shown in FIG. 2.

Accordingly, the steering with shifting system 100 is connectable to a differential 200.

The differential 200 comprises an inlet axis 201, connected to the steering column 110, for selecting one of the conventional, round or crab configurations. Furthermore, the inlet axis 201 is provided with second motion transmission means for the conventional configuration, with second motion transmission means for the round configuration, and with second motion transmission means for the crab configuration.

The differential 200 also comprises a motion outlet axis 203.

Furthermore, the differential 200 comprises two lateral axes 204, 205, for the transmission to the left wheel and the right wheel, respectively.

The inlet axis 201 and the outlet axis 203 provide movable central axes 202 to selectively engage the second transmission means, coupled at the bottom with rocking lever means 206, transmitting the position of the movable central axis 202 of the inlet axis 201 to the movable central axis 202 of the outlet axis 203.

Furthermore, the inlet axis 201, the outlet axis 203, and the second transmission means are disposed on a support 207 such as to establish a gear-to-gear transmission.

Furthermore, the right lateral axis 205 and the left lateral axis 204 and the second transmission means are disposed on such support 207 such as to establish a gear-to-gear transmission.

The features of the steering with shifting system, object of the present invention, are clear from the description made, as well as the related advantages are clear.

It is clear, finally, that the steering with shifting system thus conceived is susceptible of a number of modifications and variations, all falling within the invention; furthermore, all the details are replaceable by technically equivalent elements. In practice, the used materials, as well as the size, can be any depending on the technical requirements.

The invention claimed is:

1. A steering with shifting system for a camera dolly, said steering with shifting system comprising:
   - a steering column that can be connected to steering wheels of a camera dolly by a first motion transmission, said steering column being configured to rotate around a central axis thereof in a plurality of positions from a central position to rotate said steering wheels by said first motion transmission;
   - a handlebar integrally connected to the steering column and configured to be moved to rotate said steering column in a respective position of said plurality of positions; and
   - a support body configured to contain said first motion transmission, said support body comprising a bell-shaped sleeve coaxial to said steering column, said steering column being at least partly inserted in said bell-shaped sleeve and being pivotable with respect to said bell-shaped sleeve; and
   - a central position indication element configured to engage when said steering column is in said central position, wherein said bell-shaped sleeve has a first through hole in which said central position indication element is at least partly inserted, said steering column has a first recess configured to be aligned to said first through hole when said steering column is in said central position, and said central position indication element is configured to enter at least partly in said first recess when said steering column is in said central position.

2. The steering with shifting system, according to claim 1, wherein said central position indication element comprises:
   - an abutment body in contact with a side wall of the steering column;
   - a fastening means fixed to said bell-shaped sleeve; and
   - a first elastic element interposed between said abutment body and said fastening means, said first elastic element being configured to maintain said abutment body pushing on said side wall.

3. The steering with shifting system, according to claim 2, wherein said fastening means comprises:
   - a pawl having a through cavity;
   - a spring pusher coupled to said first elastic element and disposed at said through cavity; and
   - a closing pin housed in said through cavity and connected to said spring pusher.

4. The steering with shifting system, according to claim 1, further comprising:
   - a locking element configured to lock said steering column in said central position.

5. The steering with shifting system, according to claim 4, wherein said steering column comprises a second recess, said bell-shaped sleeve comprises a second through hole, said second recess is configured to be aligned to said second through hole when said steering column is in said central position, said locking element comprises a pin inserted in said second through hole (123) and configured to switch between a locking configuration, the pin is inserted at least partly in said second recess and in an unlocking configuration, and the pin is withdrawn from said second recess.

6. The steering with shifting system, according to claim 5, wherein said locking element comprises a lever configured to rotate to cooperate with said pin in contrast with a second elastic element to move in translation said pin to switch said pin from the unlocking configuration to the locking configuration or vice versa.

US 12,650,636 B2

9

7. The steering with shifting system, according to claim 6, wherein said pin comprises a first larger diameter portion and a second larger diameter portion identifying a first abutment wall and a second abutment wall, respectively, said second elastic element is abutment with said first abutment wall and a counterboring wall formed within said second through hole, and said lever is pivotally coupled to said bell-shaped sleeve, said lever having a cam profile cooperating with said second abutment wall to insert said pin in said second recess by switching said pin from said unlocking configuration to said locking configuration, said second elastic element being configured to push on said first abutment wall to withdraw said pin from said second recess when said lever is rotated by switching said pin from said locking configuration to said unlocking configuration.

8. The steering with shifting system, according to claim 7, wherein said lever is configured to make a 180° rotation to switch said pin from the unlocking configuration to the locking configuration or vice versa.

9. The steering with shifting system according to claim 7, wherein said pin comprises:

a bushing defining said first abutment wall; and
a washer defining said second abutment wall.

10. The steering with shifting system, according to claim 1, wherein said first motion transmission comprises a differential comprising:

an inlet axis, connected to said steering column, for selecting one of a conventional configuration, a round configuration or a crab configuration, said inlet axis being provided with a second motion transmission means for the conventional configuration, a second motion transmission means for the round configuration, and a second motion transmission means for the crab configuration;

a motion outlet axis; and
two lateral axes for a transmission to a left wheel and to a transmission to a right wheel, respectively, wherein said inlet axis and said motion outlet axis provide movable central axes to selectively engage said second transmission means, coupled at the bottom with a rocking lever means, transmitting the position of a movable central axis of the inlet axis to a movable central axis of the outlet axis, said inlet axis, said outlet axis, and said second transmission means are disposed on a support to establish a gear-to-gear transmission, and a right lateral axis and a left lateral axis and said second transmission means are further disposed on said support to establish a gear-to-gear transmission.

*  *  *  *  *